United States Patent
Morita et al.

(10) Patent No.: US 10,656,620 B2
(45) Date of Patent: May 19, 2020

(54) MOTOR CONTROL DEVICE

(71) Applicant: FANUC CORPORATION, Minamitsuru-gun, Yamanashi (JP)

(72) Inventors: Yuuki Morita, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/296,935

(22) Filed: Mar. 8, 2019

(65) Prior Publication Data

US 2019/0302728 A1    Oct. 3, 2019

(30) Foreign Application Priority Data

Mar. 27, 2018 (JP) .................................. 2018-060041

(51) Int. Cl.
*H02P 23/16* (2016.01)
*G05B 19/404* (2006.01)

(52) U.S. Cl.
CPC ............ *G05B 19/404* (2013.01); *H02P 23/16* (2016.02)

(58) Field of Classification Search
CPC ........ G05B 19/404; G05B 2219/49108; H02P 23/16
See application file for complete search history.

(56) References Cited

U.S. PATENT DOCUMENTS

| 6,479,958 | B1* | 11/2002 | Thompson | ................. B25F 5/00 318/430 |
| 9,114,519 | B2* | 8/2015 | Iwata | ......................... B25F 5/00 |
| 9,475,180 | B2* | 10/2016 | Eshleman | ............. B25B 21/004 |
| 2004/0174130 | A1* | 9/2004 | Inoue | ................. G05B 19/4065 318/569 |
| 2009/0111358 | A1* | 4/2009 | Nakao | ................... B24B 37/013 451/5 |

FOREIGN PATENT DOCUMENTS

| JP | 58-82650 | 5/1983 |
| WO | 2013-088849 | 6/2013 |

OTHER PUBLICATIONS

Notification of Reasons for Refusal dated Mar. 31, 2020 in corresponding Japanese Patent Application No. 2018-060041.

* cited by examiner

*Primary Examiner* — Thai T Dinh
(74) *Attorney, Agent, or Firm* — Wenderoth, Lind & Ponack, L.L.P.

(57) ABSTRACT

A motor control device is a motor control device which controls a spindle motor in a machine tool, and includes: a moving average filter which moving averages a torque command value or drive current value of the spindle motor for averaging time and generates averaged load information of the spindle motor; and an averaging time calculation unit which calculates, as the averaging time of the moving average filter, a first time of an integral multiple of a period of one rotation of the spindle driven by the spindle motor, or a second time of an integral multiple of a value arrived at by dividing the period of one rotation of the spindle by the number of cutting tooth of the tool.

5 Claims, 4 Drawing Sheets

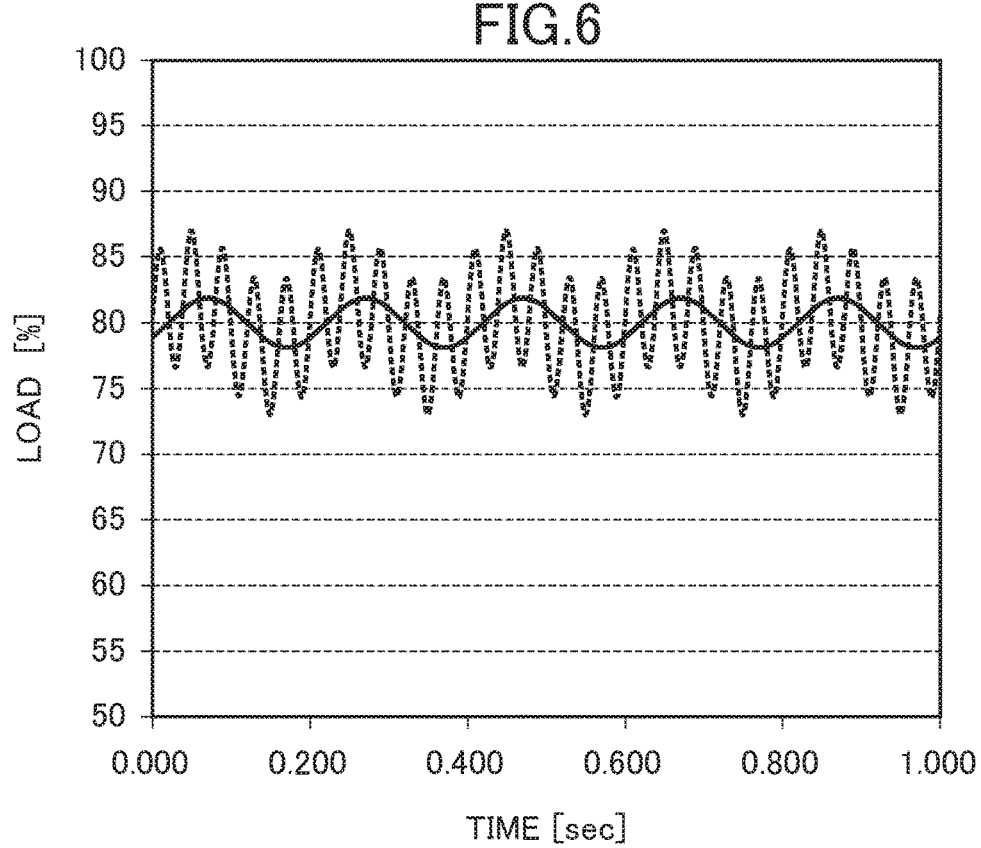
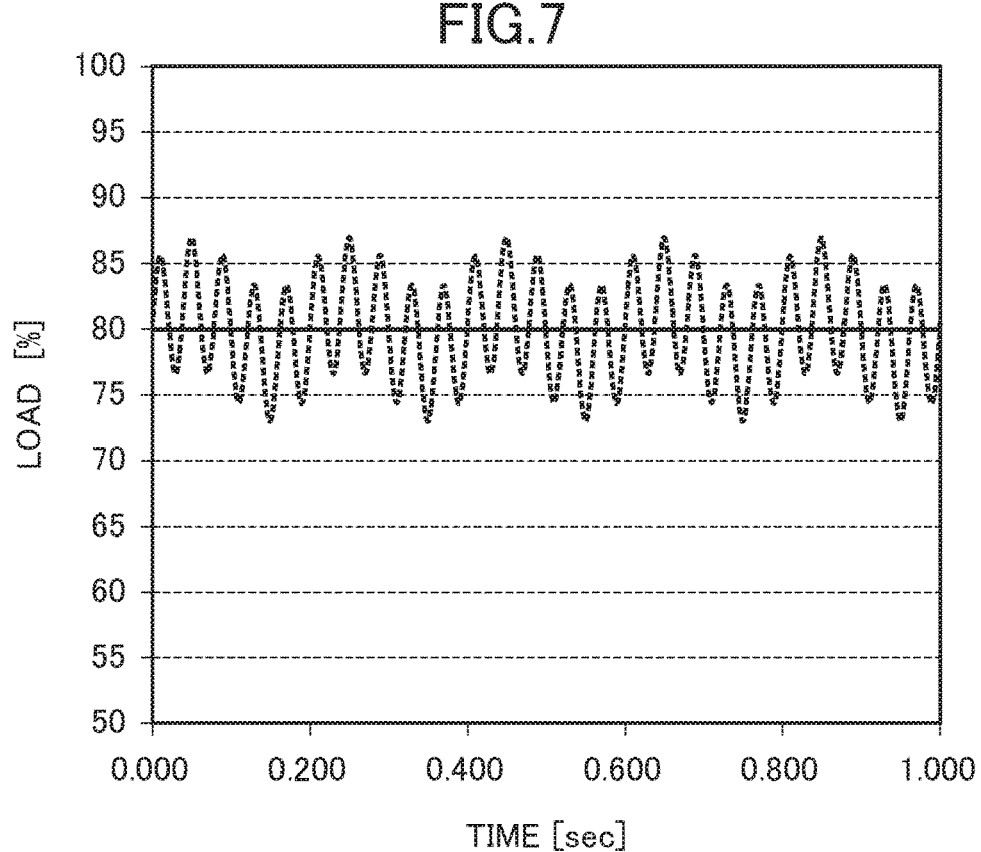

MOTOR CONTROL DEVICE

This application is based on and claims the benefit of priority from Japanese Patent Application No. 2018-060041, filed on 27 Mar. 2018, the content of which is incorporated herein by reference.

BACKGROUND OF THE INVENTION

Field of the Invention

The present invention relates to a motor control device which controls a spindle motor of a machine tool.

Related Art

As a machine tool, there are machines which perform cutting of a workpiece, for example, by rotationally driving a tool by way of a spindle motor. With such machine tools, the load on the spindle motor fluctuates during machining. When the load fluctuation (machining disturbance) of the spindle motor is large, a machining abnormality in the workpiece or an abnormality in the machine tool (for example, tool) may arise. On the other hand, when the load fluctuation (machining disturbance) of the spindle motor is small, the machining time lengthens.

Therefore, with a numerical control device, for example, it has been considered to control machining conditions (for example, feed rate (feed speed) of the feed axis) automatically in response to the load information of the spindle motor (for example, refer to Patent Document 1). Alternatively, it has been considered to display the load information of the spindle motor with the numerical control device, for example. It is thereby possible for an operator of the machine tool to control the machining conditions manually in response to the load information displayed. For example, when the load fluctuation (machining disturbance) of the spindle motor is large, it is possible to suppress the occurrence of machining abnormality in the workpiece or abnormality in the machine tool (for example, tool), by lowering the feed rate of the feed axis. On the other hand, when the load fluctuation (machining disturbance) of the spindle motor is small, it is possible to shorten the machining time by raising the feed rate of the feed axis.

Patent Document 1: PCT International Publication No. WO2013/088849

SUMMARY OF THE INVENTION

When the load fluctuation (machining disturbance) of the spindle motor is too large, for example, automatic control of the feed rate of the feed axis by the numerical control device becomes difficult. In addition, the load information displayed by the numerical control device fluctuates, for example, and thus manual control of the feed rate of the feed axis by the operator of a machine tool becomes difficult.

Concerning this point, it has been considered to average the load fluctuation (machining disturbance) of the spindle motor using a filter. However, according to the knowledge of the present inventors, it is necessary to increase the time constant in order to sufficiently suppress the load fluctuation (machining disturbance) of the spindle motor using a first-order filter that is commonly known, and the responsiveness of control of machining conditions (for example, feed rate of the feed axis) will decline.

The present invention has an object of providing a motor control device which suppresses fluctuation of load information of a spindle motor, and in the case of performing control of machining conditions, is capable of suppressing a decline in responsiveness thereof.

(1) A motor control device (e.g., the motor control device 1 described later) according to the present invention is a motor control device for controlling a spindle motor (e.g., the spindle motor 3 described later) which rotationally drives a tool or workpiece in a machine tool, the motor control device including: a moving average filter (e.g., the moving average filter 24 described later) which moving averages a torque command value or drive current value of the spindle motor for averaging time, and generates averaged load information of the spindle motor; and an averaging time calculation unit (e.g., the averaging time calculation unit 22 described later) which calculates, as the averaging time of the moving average filter, a first time of an integral multiple of a period of one rotation of the spindle driven by the spindle motor, or in a case of the spindle rotationally driving a tool, a second time of an integral multiple of a value arrived at by dividing the period of one rotation of the spindle by a number of cutting tooth of a tool held by the spindle.

(2) In the motor control device as described in (1), the averaging time calculation unit may obtain the period of one rotation of the spindle, based on a rotation number of the spindle motor indicated by a speed command value or a speed feedback value of the spindle.

(3) In the motor control device as described in (1) or (2), the averaging time calculation unit may switch between setting the first time as the averaging time, or setting the second time as the averaging time, so that magnitude of fluctuation of the load information becomes smaller.

(4) In the motor control device as described in (3), the averaging time calculation unit may switch between setting the first time as the averaging time, or setting the second time as the averaging time, based on magnitude of fluctuation of the load information.

(5) In the motor control device as described in (3), the averaging time calculation unit may switch between setting the first time as the averaging time, or setting the second time as the averaging time, based on an external command.

According to the present invention, it is possible to provide a motor control device which suppresses fluctuation in load information of a spindle motor, and in the case of performing control of machining conditions, can suppress a decline in the responsiveness thereof.

BRIEF DESCRIPTION OF THE DRAWINGS

FIG. 6 is a graph showing observation results of a torque command value (dotted line) inputted to a moving average filter, and load information (solid line) outputted from the moving average filter; and FIG. 7 is a graph showing observation results of a torque command value (dotted line) inputted to a moving average filter, and load information (solid line) outputted from the moving average filter.

DETAILED DESCRIPTION OF THE INVENTION

Hereinafter, an example of an embodiment of the present invention will be explained by referencing the attached drawings. It should be noted that the same reference symbols shall be attached to identical or corresponding portions in the respective drawings.

Figure 1:
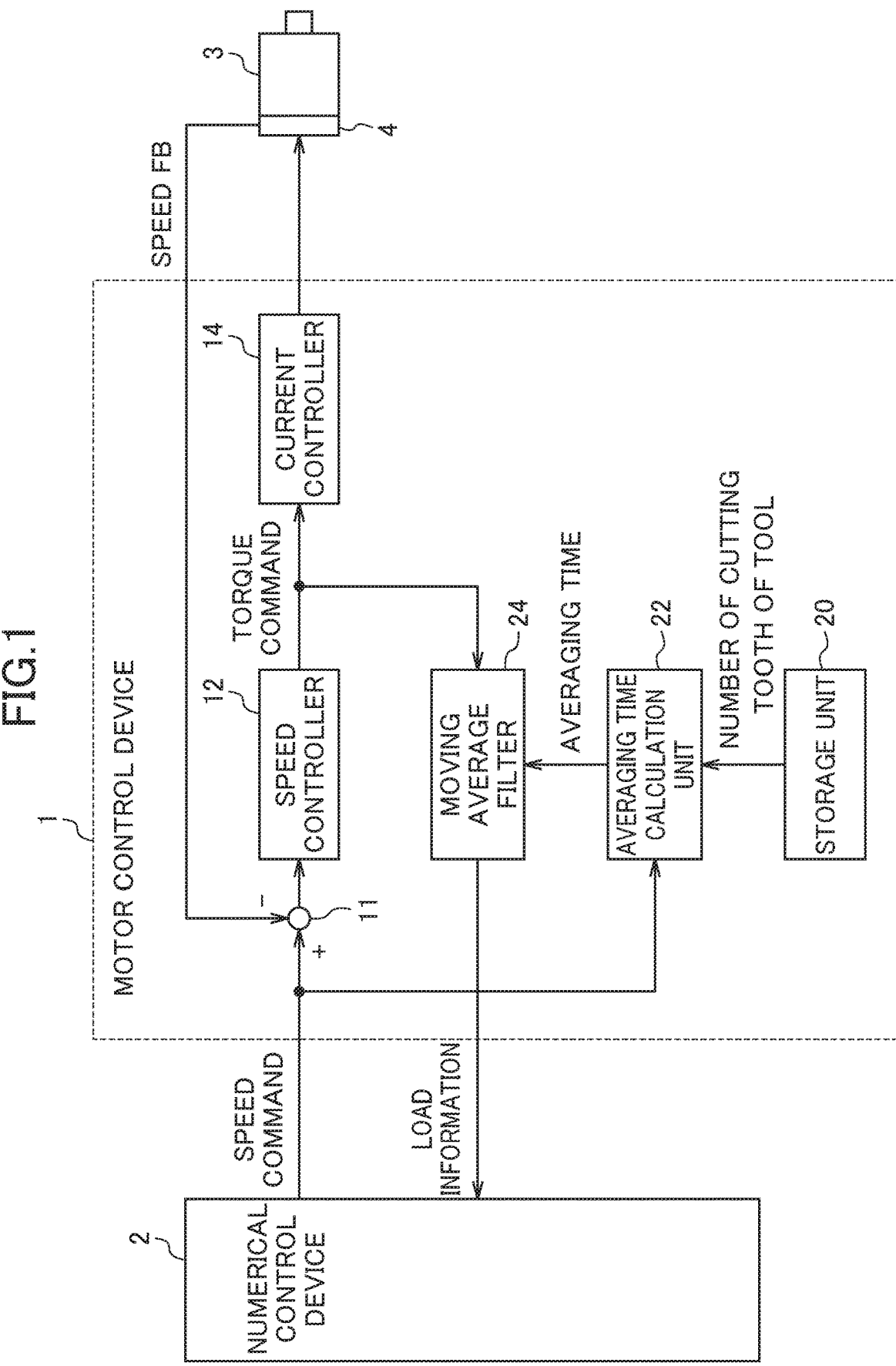
FIG. 1 is a view showing a control system including a motor control device according to the present embodiment.

FIG. 1 is a view showing a control system including a motor control device according to the present embodiment. The control system shown in FIG. 1 includes a motor control device 1 and a numerical control device 2, and controls a spindle motor 3 and feed axis motor (not shown) of a machine tool.

The spindle motor 3 rotationally drives a tool in the machine tool which performs cutting on a workpiece, for example. An encoder 4 which detects the rotation speed (rotation number) of the spindle driven by the spindle motor 3, for example, is provided to the spindle motor 3. The detected speed is used as a speed feedback value (speed FB).

The numerical control device 2 calculates a speed command value (rotation number) of the spindle driven by the spindle motor 3 based on a machining program, and supplies the calculated speed command value to the motor control device 1. In addition, the numerical control device 2 may acquire load information of the spindle motor 3 from the motor control device 1, and control the machining conditions (for example, feed rate of the feed axis) automatically according to the acquired load information. Alternatively, the numerical control device 2 may display the acquired load information on a display unit. The operator of the machine tool can thereby control the machining conditions manually according to the displayed load information. For example, when the load fluctuation (machining disturbance) of the spindle motor 3 is large, it is possible to suppress the occurrence of machining abnormality in a workpiece or the occurrence of abnormality in the machine tool (for example, tool) by lowering the feed rate of the feed axis. On the other hand, when the load fluctuation (machining disturbance) of the spindle motor 3 is small, it is possible to shorten the machining time by raising the feed rate of the feed axis.

The motor control device 1 controls the spindle motor 3, based on the speed command value calculated by the numerical control device 2. The motor control device 1 includes a subtracter 11, a speed controller 12 and a current controller 14. The subtracter 11 obtains the error between the speed command value and the speed feedback value detected by the encoder 4. The speed controller 12 calculates a torque command value of the spindle motor 3, based on the error obtained by the subtracter 11. The current controller 14 calculates a drive current value for driving the spindle motor 3 based on the torque command value calculated by the speed controller 12, and supplies the calculated drive current value to the spindle motor 3.

Furthermore, the motor control device 1 includes a storage unit 20, averaging time calculation unit 22, and moving average filter 24. The storage unit 20 stores the number of cutting tooth of the tool as tool information. The storage unit 20 is rewritable memory such as EEPROM, for example.

The averaging time calculation unit 22 acquires the speed command value supplied from the numerical control device 2, and acquires the number of cutting tooth of the tool stored in the storage unit 20. The averaging time calculation unit 22 calculates the averaging time of the moving average filter 24. More specifically, the averaging time calculation unit 22 calculates a first time of an integral multiple of the period of 1 rotation of the spindle which is driven by the spindle motor 3, as the averaging time T. More specifically, the averaging time calculation unit 22 calculates an averaging time (first time) T according to Formula (1) below, based on the rotation number Vcmd (rev/s) of the spindle indicated by the speed command value (i.e. cycle 1/Vcmd (s) of 1 rotation of spindle).

$$T = 1/V\text{cmd} \times n \quad (1)$$

n is any integer

Alternatively, the averaging time calculation unit 22 calculates a second time of an integral multiple of a value arrived at by dividing by the period of 1 rotation of the spindle driven by the spindle motor 3 by the number of cutting tooth of the tool held by the spindle, as the averaging time T. More specifically, the averaging time calculation unit 22 calculates an averaging time (second time) T according to Formula (2) below, based on the rotation number Vcmd (rev/s) of the spindle indicated by the speed command value (i.e. cycle 1/Vcmd (s) of 1 rotation of the spindle) and the number of cutting tooth N of the tool.

$$T = 1/(V\text{cmd} \times N) \times n \quad (2)$$

The averaging time calculation unit 22 switches between setting the first time calculated according to the above Formula (1) as the averaging time T, or setting the second time calculated according to the above Formula (2) as the averaging time T, so that the magnitude of fluctuation (machining disturbance) of the load information which was moving averaged by the moving average filter 24 becomes smaller. For example, the averaging time calculation unit 22 may automatically perform switching of the above-mentioned averaging time T, based on the magnitude of fluctuation of the load information which was moving averaged by the moving average filter 24. In this case, the averaging time calculation unit 22, for example, may be based on the magnitude of the amplitude of load information, or may be based on the magnitude of the fluctuation frequency component by FFT analyzing the load information. Alternatively, the averaging time calculation unit 22 may perform switching of the above-mentioned averaging time T based on an external command. The external command may be supplied from the numerical control device 2. In this case, the numerical control device 2 may automatically determine the magnitude of the fluctuation in load information in the aforementioned way, for example, based on the magnitude of the amplitude of load information, or the magnitude of the fluctuation frequency component after FFT analyzing the load information. Alternatively, the external command may be inputted manually by the operator. In this case, the operator may determine visually the magnitude of the fluctuation in load information, based on the magnitude of the amplitude of the load information displayed on the numerical control device 2.

It should be noted that the tool information is stored in the storage unit of the numerical control device 2, and the averaging time calculation unit 22 may acquire the tool information from the numerical control device 2. In this case, the storage unit 20 may not be provided. In addition, the averaging time calculation unit 22 may use a speed feedback value detected by the encoder 4, in place of the speed command value.

The moving average filter 24 calculates averaged load information of the spindle motor 3, by moving averaging the torque command value of the spindle motor 3, at the averaging time calculated by the averaging time calculation unit 22. It should be noted that the moving average filter 24 may use the drive current value of the spindle motor 3 calculated by the current controller 14, in place of the torque command value.

The motor control device 1 and numerical control device 2, for example, are configured by an arithmetic processor such as DSP (Digital Signal Processor) or FPGA (Field-Programmable Gate Array). The various functions of the motor control device 1 and numerical control device 2 are realized by executing predetermined software (programs) stored in a storage unit, for example. The various functions of the motor control device 1 and numerical control device 2 may be realized by cooperation between hardware and software, or may be realized by only hardware (electrical circuits).

Figure 2:
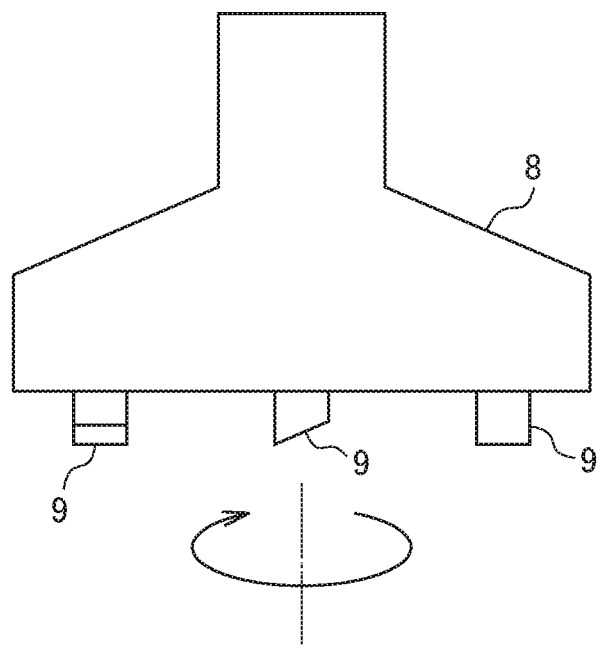
FIG. 2 is a side view of an example of a tool.
Figure 3:
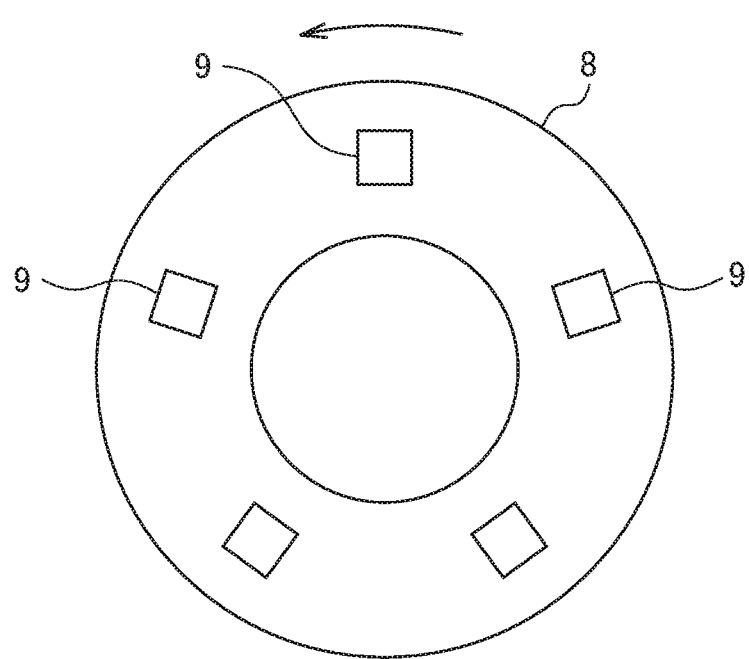
FIG. 3 is a plan view of an example of a tool.

Next, the tool which is rotationally driven by the spindle motor 3 (i.e. spindle) will be explained. FIG. 2 is a side view of an example of the tool, and FIG. 3 is a plan view of an example of the tool. The tool 8 shown in FIGS. 2 and 3 includes five cutting tooth 9 relative to the rotary axis in the arrow direction, and is rotationally driven in the arrow direction by the spindle driven by the spindle motor 3. With such a tool 8, (i) Load fluctuation (machining disturbance) of the spindle motor 3 occurs at the period of 1/5 times of 1 rotation of the spindle (frequency of 5 times), caused by each cutting teeth 9 contacting the work, (ii) Load fluctuation (machining disturbance) of the spindle motor 3 occurs at the period of 1 rotation of the spindle, caused by the five cutting tooth 9 being arranged eccentrically relative to the rotary axis, or (iii) Load fluctuation (machining disturbance) of the spindle motor 3 occurs at the period of 1/5 times of 1 rotation of the spindle (frequency of 5 times), caused by any of the five cutting tooth 9 being arranged eccentrically relative to the rotary axis.

When the load of the spindle motor 3 fluctuates in this way, the automatic control of the feed axis feed rate by the numerical control device 2 becomes difficult in the aforementioned way, for example. In addition, the load information displayed by the numerical control device 2 fluctuates, for example, and the manual control of the feed axis feed rate by the operator of the machine tool becomes difficult.

Therefore, it has been considered to average the load fluctuation (machining disturbance) of the spindle motor 3 using a filter. However, according to the knowledge of the present inventors, it is necessary to increase the time constant in order to sufficiently suppress the load fluctuation (machining disturbance) of the spindle motor 3 using a commonly known first-order filter (time constant fixed), and thus the responsiveness of control of the machining conditions (for example, feed axis feed rate) declines. On the other hand, when making the time constant of the first-order filter too small, control will become unstable by the influence of load fluctuation (machining disturbance), and the fluctuation (variation) in load display increases, depending on the machining conditions.

Concerning this point, according to the motor control device 1 of the present embodiment, the load fluctuation of the spindle motor 3 is averaged using the moving average filter 24 rather than a first-order filter. At this time, the first time of an integral multiple of the period of 1 rotation of the spindle driven by the spindle motor 3 (above Formula (1)), or the second time of an integral multiple of a value arrived at by dividing the period of 1 rotation of the spindle driven by the spindle motor 3 by the number of cutting tooth of the tool 8 (above Formula (2)) is set as the averaging time of the moving average filter 24. In other words, the time of an integral multiple of the period of the load fluctuation (machining disturbance) of the spindle motor 3 caused by the above-mentioned (i) to (iii) is set as the averaging time of the moving average filter 24. It is thereby possible to sufficient suppress fluctuation of the load information of the spindle motor 3. In addition, the delay time of the load information can be shortened, and in the case of performing control of the machining conditions, a decline in the responsiveness thereof is suppressible.

Furthermore, according to the motor control device 1 of the present embodiment, the averaging time calculation unit 22 can switch between setting the first time calculated according to the above Formula (1) as the averaging time T, or setting the second time calculated according to the above Formula (2) as the averaging time T, so that the magnitude of fluctuation in load information (machining disturbance) which was moving averaged by the moving average filter 24 becomes smaller. For example, the above-mentioned (i) load fluctuation (machining disturbance) of the spindle motor 3 caused by each cutting teeth 9 contacting a workpiece, and (iii) load fluctuation (machining disturbance) of the spindle motor 3 caused by any of the five cutting tooth 9 being arranged eccentrically relative to the rotary axis are suppressible by either the moving average filter 24 of the averaging time (first time) T calculated according to the above Formula (1), and the moving average filter 24 of the averaging time (second time) calculated according to the above Formula (2). On the other hand, the above-mentioned (ii) load fluctuation (machining disturbance) of the spindle motor 3 caused by the five cutting tooth 9 being arranged eccentrically relative to the rotary axis cannot be suppressed by the moving average filter 24 of the averaging time (second time) T calculated according to the above Formula (2), but is suppressible by the moving average filter 24 of the averaging time (first time) T calculated according to the above Formula (1). In this case, the averaging time calculation unit 22 may switch so as to calculate the averaging time (first time) T calculated according to the above Formula (1), as the averaging time of the moving average filter 24. Hereinafter, the effects thereof will be verified.

FIGS. 4 to 7 are graphs showing the observation results of the torque command value inputted to the moving average filter 24 (dotted line) and the load information outputted from the moving average filter 24 (solid line). The observation conditions in FIGS. 4 to 7 are as follows.

Figure 4:
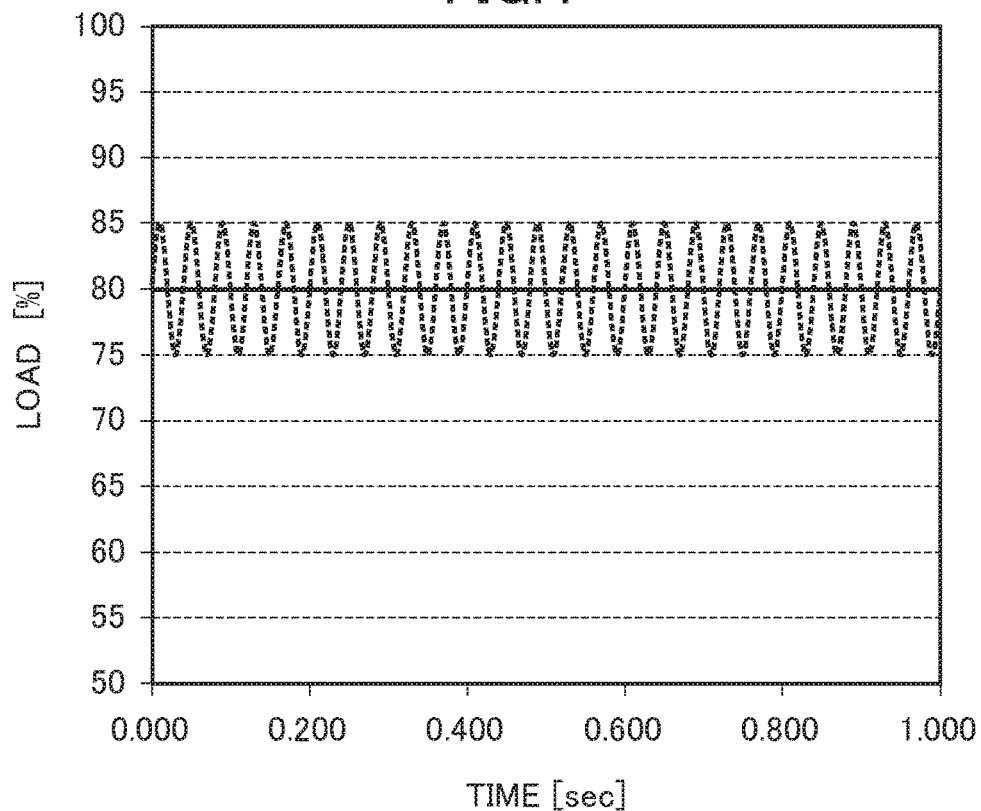
FIG. 4 is a graph showing observation results of a torque command value (dotted line) inputted to a moving average filter, and load information (solid line) outputted from the moving average filter.
Figure 5:
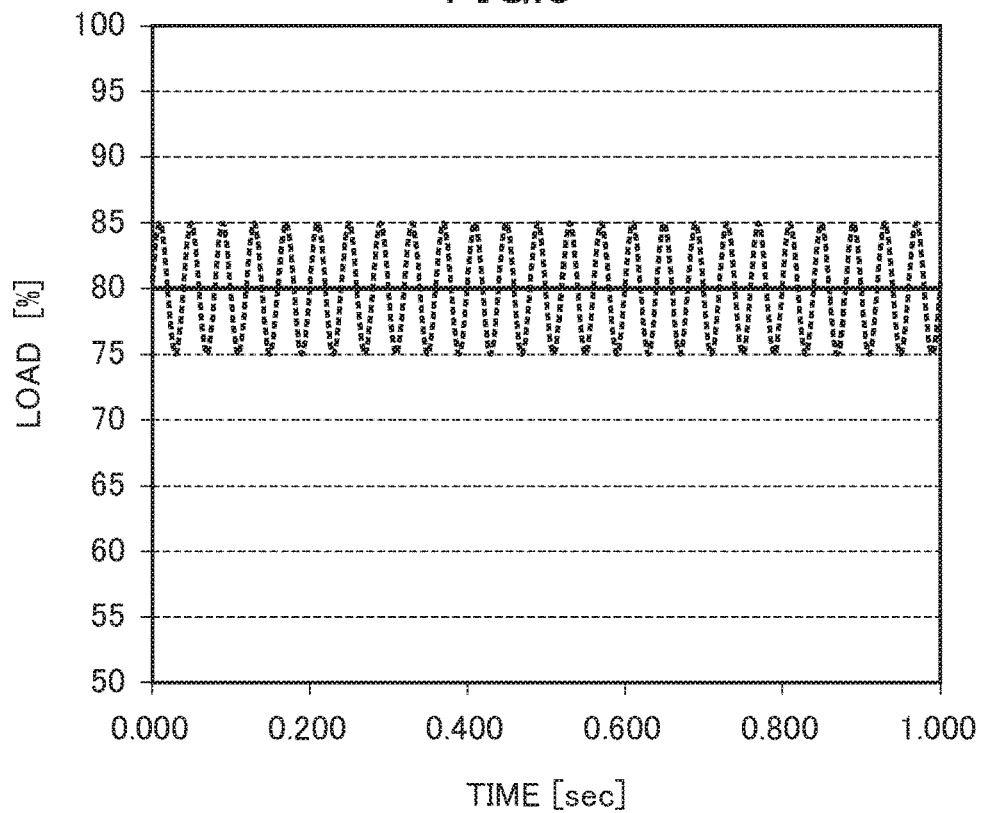
FIG. 5 is a graph showing observation results of a torque command value (dotted line) inputted to a moving average filter, and load information (solid line) outputted from the moving average filter.

Rotation number of spindle Vcmd=300 $\text{min}^{-1}$
i.e. frequency caused by 1 rotation of spindle=5 Hz
In other words, period of 1 rotation of spindle 1/Vcmd=0.2 s
Number of cutting tooth N of tool 8=5
i.e. frequency caused by number of cutting tooth N of tool 8=25 Hz
In other words, period caused by number of cutting tooth N of tool 8 1/(Vcmd×N)=0.04 s
Average load of spindle motor 3=80%
In FIGS. 4 and 5,
no fluctuation caused by 1 rotation of spindle,
fluctuation caused by number of cutting tool N of tool 8 is 5%.
In FIG. 4, the averaging time of the moving average filter 24 is set to the averaging time (second time) T=40 ms (n=1 times) calculated according to the above Formula (2), and in FIG. 5, the averaging time of the moving average filter 24 is set to averaging time (first time) T=200 ms (n=1 times) calculated according to the above Formula (1). According to FIGS. 4 and 5, it is found that the fluctuation caused by the number of cutting tooth N of the tool 8 is suppressed by either the moving average filter 24 of the averaging time (first time) calculated according to the above Formula (1), and the moving average filter 24 of the averaging time (second time) calculated according to the above Formula (2). In other words, the above-mentioned (i) load fluctuation (machining disturbance) of the spindle motor 3 caused by each cutting teeth 9 contacting the workpiece, and (iii) load fluctuation (machining disturbance) of the spindle motor 3 caused by any of the five cutting tooth 9 being arranged eccentrically relative to the rotary axis are suppressed by either of the moving average filter 24 of averaging time (first time) T calculated according to the above Formula (1), and the moving average filter 24 of the averaging time (second time) calculated according to the above Formula (2).

Next, in FIGS. 6 and 7, further to FIGS. 4 and 5, fluctuation caused by 1 rotation of the spindle is 2%.

In FIG. 6, the averaging time of the moving average filter 24 was set to the averaging time (second time) T=40 ms (n=1 times) calculated according to the above Formula (2), and in FIG. 7, the averaging time of the moving average filter 24 was set to the averaging time (first time) T=200 ms (n=1 times) calculated according to the above Formula (1). According to FIGS. 6 and 7, it is found that the fluctuation caused by 1 rotation of the spindle is not suppressed by the moving average filter 24 of the averaging time (second time) T calculated according to the above Formula (2), but is suppressed by the moving average filter 24 of the averaging time (first time) calculated according to the above Formula (1). In other words, it is found that the above-mentioned (ii) load fluctuation (machining disturbance) of the spindle motor 3 caused by the five cutting tooth 9 being arranged eccentrically relative to the rotary axis is not suppressed by the moving average filter 24 of the averaging time (second time) T calculated according to the above Formula (2), but is suppressed by the moving average filter 24 of the averaging time (first time) T calculated according to the above Formula (1).

Although an embodiment of the present invention has been explained above, the present invention is not to be limited to the aforementioned embodiment, and various changes and modifications thereto are possible. For example, the aforementioned embodiment exemplifies the motor control device 1 which calculates load information of the spindle motor 3, in which the spindle motor 3 (spindle) rotationally drives a tool. However, the features of the present invention is not limited thereto, and are also applicable to a motor control device 1 which calculates load information of the spindle motor 3, in which the spindle motor 3 (spindle) rotationally drives the workpiece. In this case, the first time (above Formula (1)) of an integral multiple of the period of 1 rotation of the spindle which is driven by the spindle motor 3 is set as the averaging time of the moving average filter 24. It is thereby possible to suppress load fluctuation (machining disturbance) of the spindle motor 3 occurring at the period of 1 rotation of the spindle driven by the spindle motor 3, caused by the workpiece being arranged eccentrically relative to the rotary axis (corresponding to above-mentioned (ii)).

In addition, the aforementioned embodiment exemplifies the motor control device 1 which calculates load information of the spindle motor 3 rotationally driving a tool which includes five cutting tooth. However, the features of the present invention are not limited thereto, and are applicable to a motor control device which calculates load information of the spindle motor 3 rotationally driving a tool which includes two or more cutting tooth.

In addition, the aforementioned embodiment exemplifies the motor control device 1 which performs speed control based on a speed command value from the numerical control device 2. However, the features of the present invention are not limited thereto, and are also applicable to a motor control device which performs position control based on a position command value from a numerical control device.

EXPLANATION OF REFERENCE NUMERALS

1 motor control device
2 numerical control device
3 spindle motor
4 encoder
8 tool
9 cutting teeth
11 subtracter
12 speed controller
14 current controller
20 storage unit
22 averaging time calculation unit
24 moving average filter

What is claimed is:

1. A motor control device for controlling a spindle motor which rotationally drives a tool or workpiece in a machine tool, the motor control device comprising:
 a moving average filter which moving averages a torque command value or drive current value of the spindle motor for averaging time, and generates averaged load information of the spindle motor; and
 an averaging time calculation unit which calculates, as the averaging time of the moving average filter, a first time of an integral multiple of a period of one rotation of the spindle driven by the spindle motor, or in a case of the spindle rotationally driving a tool, a second time of an integral multiple of a value arrived at by dividing the period of one rotation of the spindle by a number of cutting tooth of a tool held by the spindle.

2. The motor control device according to claim 1, wherein the averaging time calculation unit obtains the period of one rotation of the spindle, based on a rotation number of the spindle motor indicated by a speed command value or a speed feedback value of the spindle.

3. The motor control device according to claim 1, wherein the averaging time calculation unit switches between setting the first time as the averaging time, or setting the second time as the averaging time, so that magnitude of fluctuation of the load information becomes smaller.

4. The motor control device according to claim 3, wherein the averaging time calculation unit switches between setting the first time as the averaging time, or setting the second time as the averaging time, based on magnitude of fluctuation of the load information.

5. The motor control device according to claim 3, wherein the averaging time calculation unit switches between setting the first time as the averaging time, or setting the second time as the averaging time, based on an external command.

* * * * *